June 11, 1935.	L. BOND ET AL	2,004,848
GARMENT STRETCHER
Filed Oct. 9, 1934	2 Sheets-Sheet 1
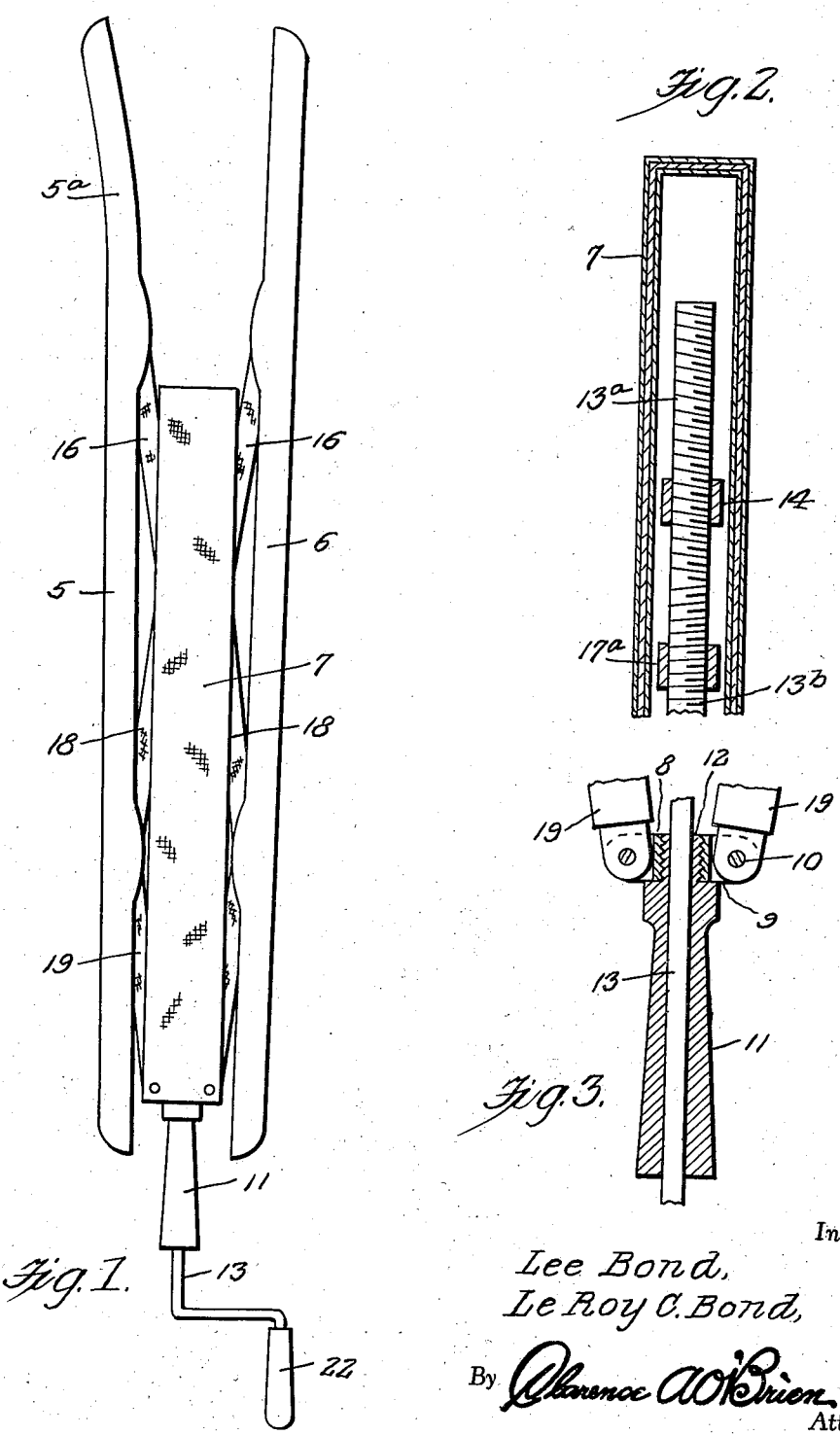
Inventors
Lee Bond,
LeRoy C. Bond,
By *Clarence A. O'Brien*
Attorney

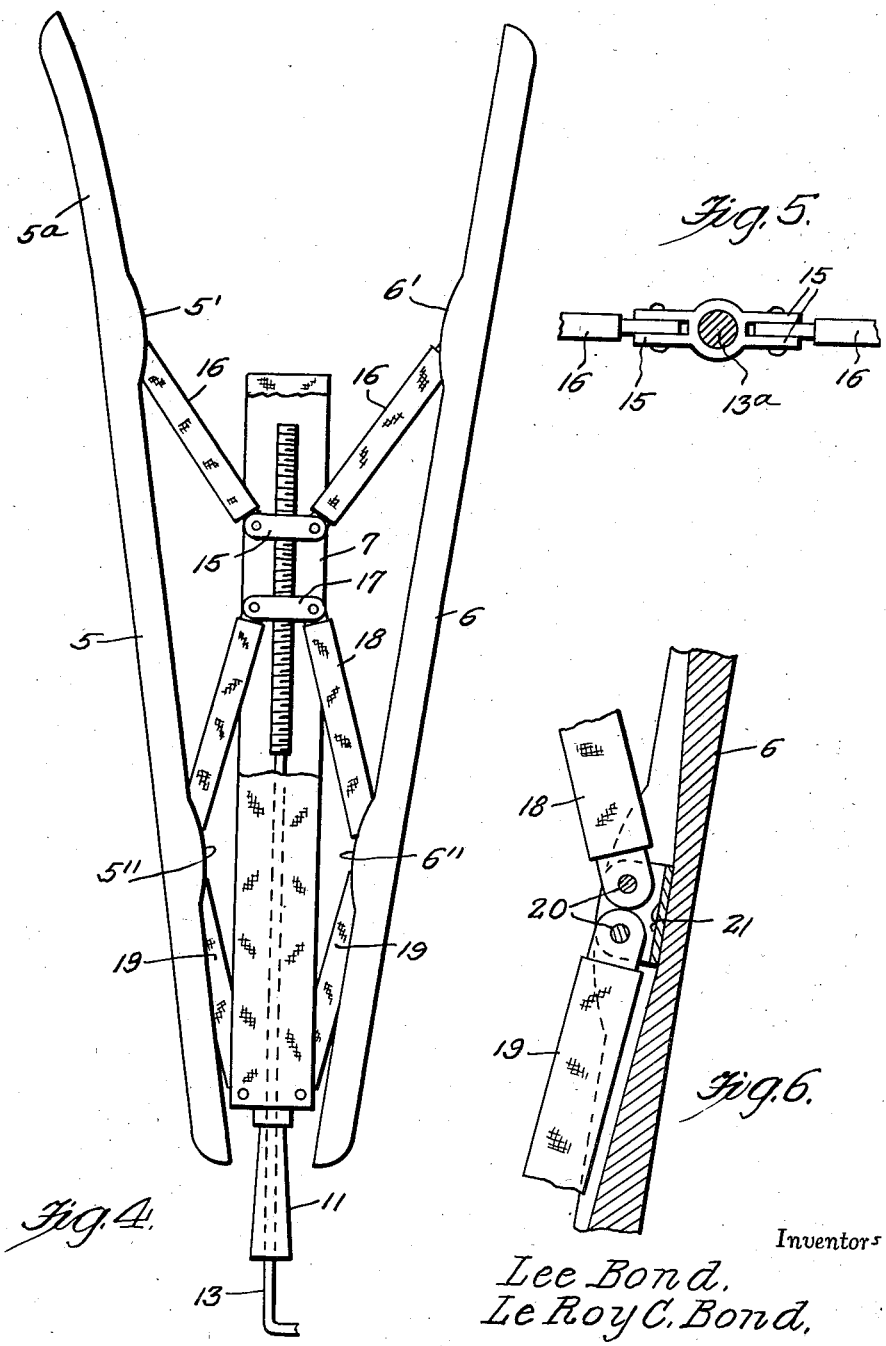

Patented June 11, 1935

2,004,848

UNITED STATES PATENT OFFICE 2,004,848

GARMENT STRETCHER

Lee Bond and Le Roy Clair Bond, Brookfield, Mo., assignors to The Davis Company, Omaha, Nebr., a corporation of Nebraska Application October 9, 1934, Serial No. 747,640

5 Claims. (Cl. 223—19)

This invention relates to garment stretchers and has as its object the provision of a device of this character which is especially adapted for use in stretching the legs of trousers, and especially flannel trousers, and trousers of wash materials so as to prevent shrinking of the trousers.

The invention, together with its objects and advantages, will be best understood from a study of the following description taken in connection with the accompanying drawings wherein:

Figure 1 is an elevational view of the stretcher in collapsed or contracted condition.

Figure 2 is an enlarged fragmentary detail sectional view through a U-shaped member and screw forming part of the device.

Figure 3 is a fragmentary sectional view showing a handle and associated parts hereinafter more fully referred to.

Figure 4 is an elevational view of the stretcher in partly expanded condition, certain parts being broken away.

Figure 5 is a fragmentary detail sectional elevational view showing a nut on the screw and arms or links pivotally connected with the nut.

Figure 6 is an enlarged fragmentary detail view showing the manner of connecting the arms with the legs or side members of the stretcher.

Referring to the drawings by reference numerals, it will be seen that the stretcher comprises a pair of complemental side members 5 and 6 formed of wood or other suitable material, and one of the members, for example, the member 5 at one end, is curved slightly as at 5a to correspond to the curvature of the seat of trousers or the like.

A substantially U-shaped member 7 formed of metal or other suitable material covered by a suitable fabric has secured between the sides thereof at the open end of the U, a threaded sleeve 8 provided with pairs of oppositely extending ears 9 that are apertured to accommodate pivot pins 10 through the medium of which the sleeve 8 is secured at the open end of the U-shaped member 7.

As shown in Figure 3, a hollow handle 11 for the device is provided with an integral threaded pin 12 that is screwed into the sleeve 8 as shown.

A shaft 13 extends through the handle 11 between the sides of the U-shaped member 7 and, at the free end thereof, the shaft 13 is diametrically enlarged and provided with oppositely threaded portions 13a and 13b, respectively.

A follower or nut 14 operates on the threaded section 13a of the shaft and is provided with oppositely extending pairs of ears 15 to which are pivoted one end of links or arms 16 formed of metal or other suitable material and covered with fabric as shown. At the free end thereof, the arms or links 16 are pivoted to a substantially channel-shaped plate provided in grooves or channels formed in the enlargements 5' and 6' of the side members 5 and 6.

Operating on the threaded section 13b of the rod 13 is a nut or follower 17 provided with pairs of oppositely extending ears to which are pivoted one end of arms or links 18 similar to the aforementioned arms or links 16.

Other links or arms 19 are connected at one end with the aforementioned pins 10, and the links 18 and 19 are connected with the side members 5 and 6 through the medium of pins 20 that pivotally connect the links 18 and 19 between the sides or flanges of channel plates 21 secured within grooves or channels provided at the enlarged portions 5" and 6" of the side members 5 and 6.

For rotating the rod 13, the latter is provided on its free end with a crank bar handle 22 as shown in Figure 1. From the above detailed description, it will be apparent that by holding the device with the handle 11 grasped in one hand, the operator with the other hand operating the crank 22 may rotate the shaft 13 in a manner to cause a movement of the nuts or followers 14 and 17 relative to the rods in the proper direction for spreading the side members 5 and 6 apart or drawing said members inwardly towards one another or placing said members at the desired angular relation as is required to either accommodate the stretcher to the garment to be stretched thereby or to remove the stretcher from the garment.

What is claimed is:

1. In a garment stretcher of the character described, a substantially U-shaped member having a sleeve secured in one end thereof, a handle having a threaded engagement with the sleeve, a rod having a non-threaded portion extending through and rotatable in the handle, said rod having an operating crank on one end and reversely threaded portions on a relatively opposite end, follower nuts on the threaded portions of the rod, a pair of side members, links pivotally connecting the follower nuts with the side members, and other links pivotally connecting said sleeve with the side members.

2. In a garment stretcher of the character described, a substantially U-shaped member having a sleeve secured in one end thereof, a handle having a threaded engagement with the sleeve, a rod having a non-threaded portion extending through and rotatable in the handle, said rod having an operating crank on one end and reversely threaded portions on a relatively opposite end, follower nuts on the threaded portions of the rod, a pair of side members, links pivotally connecting the follower nuts with the side members, and other links pivotally connecting said sleeve with the side members, one of said side members being substantially straight throughout its length, and the other of said side members at the end thereof remote from said handle having a curved portion curving away from the adjacent end of the other of said side members.

3. In a garment stretcher of the character described, a pair of complemental side members, an elongated U-shaped member, a sleeve fixedly secured between the sides of the U-shaped member at the open end of said member, a handle having an end portion threaded into the sleeve, a rod having a part thereof extending through and rotatable relative to the handle, said rod having an end portion operating between the sides of the U-shaped member and provided at said end portions with oppositely threaded sections, follower nuts engaged with the threaded sections of the rod, links pivotally connecting the side members with the follower nuts, additional links pivotally connecting the sleeve with the side members so that upon rotation of the rod said side members may be moved laterally towards and away from one another and also into different angular positions relative to one another.

4. In a garment stretcher of the character described, a pair of complemental side members, an elongated U-shaped member, a sleeve fixedly secured between the sides of the U-shaped member at the open end of said member, a handle having an end portion threaded into the sleeve, a rod having a part thereof extending through and rotatable relative to the handle, said rod having an end portion operating between the sides of the U-shaped member and provided at said end portions with oppositely threaded sections, follower nuts engaged with the threaded sections of the rod, links pivotally connecting the side members with the follower nuts, additional links pivotally connecting the sleeve with the side members so that upon rotation of the rod said side members may be moved laterally towards and away from one another and also into different angular positions relative to one another, said U-shaped member and said links respectively being covered with fabric.

5. In a garment stretcher of the character described, a pair of complemental side members, an elongated U-shaped member, a sleeve fixedly secured between the sides of the U-shaped member at the open end of said member, a handle having an end portion threaded into the sleeve, a rod having a part thereof extending through and rotatable relative to the handle, said rod having an end portion operating between the sides of the U-shaped member and provided at said end portion with oppositely threaded sections, follower nuts engaged with the threaded sections of the rod, links pivotally connecting the side members with the follower nuts, additional links pivotally connecting the sleeve with the side members so that upon rotation of the rod said side members may be moved laterally towards and away from one another and also into different angular positions relative to one another, said U-shaped member and said links respectively being covered with fabric, and said side members having channels formed in the inner side edges thereof and plates to which said links are pivotally connected secured within the channels.

LEE BOND.
LE ROY CLAIR BOND.